United States Patent
Low et al.

(10) Patent No.: US 7,113,182 B2
(45) Date of Patent: Sep. 26, 2006

(54) SYSTEM AND METHOD FOR SHARING GENERAL PURPOSE DATA LINES BETWEEN A DISPLAY PANEL AND NON-DISPLAY DEVICES

(75) Inventors: Yun Shon Low, Richmond (CA); Peter Chia, Port Coquitlam (CA)

(73) Assignee: Seiko Epson Corporation, Tokyo (JP)

( * ) Notice: Subject to any disclaimer, the term of this patent is extended or adjusted under 35 U.S.C. 154(b) by 375 days.

(21) Appl. No.: 10/621,980

(22) Filed: Jul. 17, 2003

(65) Prior Publication Data

US 2005/0012701 A1    Jan. 20, 2005

(51) Int. Cl.
 G09G 5/00    (2006.01)
 G06F 3/00    (2006.01)

(52) U.S. Cl. .................... 345/204; 348/370; 710/8

(58) Field of Classification Search .......... 345/1.1–3.3, 345/98, 204; 348/310; 710/8
See application file for complete search history.

(56) References Cited

U.S. PATENT DOCUMENTS

| 4,926,166 | A |   | 5/1990 | Fujisawa et al. |
|---|---|---|---|---|
| 4,984,177 | A | * | 1/1991 | Rondel et al. ............ 704/277 |
| 5,287,092 | A |   | 2/1994 | Shiraishi |
| 5,448,260 | A |   | 9/1995 | Zenda et al. |
| 5,592,187 | A |   | 1/1997 | Zenda |
| 5,606,336 | A |   | 2/1997 | Yuki |
| 5,896,116 | A |   | 4/1999 | Torizuka et al. |
| 5,963,192 | A | * | 10/1999 | Wong et al. ............... 345/593 |
| 6,043,798 | A | * | 3/2000 | Yamamoto et al. ......... 345/1.1 |
| 6,247,090 | B1 |   | 6/2001 | Arai et al. |
| 6,340,959 | B1 |   | 1/2002 | Inamori |
| 6,369,824 | B1 |   | 4/2002 | Lee |
| 6,499,086 | B1 |   | 12/2002 | Belt et al. |
| 6,774,912 | B1 |   | 8/2004 | Ahmed et al. |
| 6,954,184 | B1 |   | 10/2005 | Kurashima et al. |
| 2002/0118144 | A1 |   | 8/2002 | Edmonds |
| 2004/0058715 | A1 | * | 3/2004 | Taniguchi et al. .......... 455/566 |
| 2004/0183895 | A1 | * | 9/2004 | Kikuchi ................. 348/14.02 |

FOREIGN PATENT DOCUMENTS

EP    0 579 498    1/1994

* cited by examiner

Primary Examiner—Amr A. Awad
Assistant Examiner—Michael Pervan
(74) Attorney, Agent, or Firm—Mark P. Watson

(57) ABSTRACT

A graphics controller includes a memory region configured to store image data for display on a display panel in communication with the graphics controller. Interface circuitry modules where each of the interface circuitry modules is configured to transmit data from the graphics controller over a set of shared data lines are provided. Selection circuitry configured to select data from one of the interface circuitry modules for transmission over the set of shared data lines is included. Line sharing circuitry configured to inform each of the interface circuitry modules to transmit control data is included. The line sharing circuitry is further configured to generate select signals for the selection circuitry. The select signals enable the selection circuitry to select the data from one of the interface circuitry modules for transmission over the shared data lines. A method for driving a display panel and peripheral devices associated with the display panel through common data lines is also provided.

11 Claims, 4 Drawing Sheets

SYSTEM AND METHOD FOR SHARING GENERAL PURPOSE DATA LINES BETWEEN A DISPLAY PANEL AND NON-DISPLAY DEVICES

CROSS REFERENCE TO RELATED APPLICATIONS

This application is related to U.S. patent application Ser. No. 10/621,596, filed on the same day as the instant application and entitled "SYSTEM AND METHOD FOR DISPLAYING A PARALLEL PANEL SIMULTANEOUSLY WITH AN RGB PANEL." This related application is hereby incorporated by reference for all purposes.

BACKGROUND OF THE INVENTION

1. Field of the Invention

This invention relates generally to computer graphics, and more particularly to a scheme for sharing data lines in a multi-functional handheld device.

2. Description of the Related Art

The number of cellular phone users in the U.S. is now estimated at about 17 million and continues to grow at a rate exceeding 20 percent per year. Most of this growth in use has occurred in and around cities and towns with populations of 20,000 or more and has caused saturation of the channels available for cellular communication in many of these urban areas. Cellular service zones servicing about eight-hundred cellular telephone communications have decreased in size from several miles in diameter to a few hundred meters in diameter as the density of cell phone users has increased apace in urban and suburban areas.

To increase market share, cellular phone manufactures have increased features available on a cell phone, such as providing a color RGB (red, green, blue) panel display. As will be apparent to those skilled in the art, RGB is a color model used for generating images (still or video) on a display screen. Additionally, cellular phones are being provided with multi-functional capabilities. For example, cellular phones are now available that include the capability to function as a digital camera. Thus, the lines separating cellular phones and other handheld devices, e.g., digital cameras, personal digital assistants, pagers, etc., are becoming blurred. Moreover, features such as enabling a user to choose between multiple ring tones, are popular with consumers.

FIG. 1 is a simplified schematic diagram illustrating the configuration of the data lines for a multi-functional hand held device. Device 100 includes two sections 102 and 104 with data lines 116, 118 and 120 enabling communication between the two sections. For example, device 100 may be a cellular flip-phone where section 102 includes display controller 108 and central processing unit (CPU) 106, as well as a battery. Section 104 includes panel module 110, camera module 112, and external memory module 114. In order to control the peripherals of section 102, separate data lines are used for each peripheral module. That is, 18 data lines are used for panel module 110, 8 data lines are used for camera module 112, and 8 data lines are used for external memory module 114. In addition to the data lines, the dual section configuration uses separate control lines for each peripheral to provide control information between the two sections. For example, parallel panel module 110 may require 4 control lines, while camera module 112 and external memory module 114 are each associated with one control line.

Hence, the prior art dual section configuration requires about forty signal lines to provide control and data for the dual sections 102 and 104. As can be appreciated by those skilled in the art, each signal line requires an input/out (I/O) pad on either display controller 108 or CPU 106. Thus, forty signal lines require forty I/O pads, which greatly increases power consumption and routing complexity. Furthermore, the greater the number of lines routed between the two sections increases the size of the printed circuit board (PCB) to which the signal lines are connected. Another shortcoming of the large number of lines routed between the sections is that the durability of device 100 suffers due to the sheer number of lines contained by a flex cable running between the two sections. That is, as the number of signal lines increases, the manufacturing costs increase and the robustness of the device suffers.

In view of the foregoing, there is a need for minimizing the number of lines running between the controllers and the peripherals while maintaining the multi-functional capability of the handheld device.

SUMMARY OF THE INVENTION

Broadly speaking, the present invention fills these needs by providing a method and apparatus for using common data lines for the display panel and the peripheral components. It should be appreciated that the present invention can be implemented in numerous ways, including as a process, a system, or a device. Several inventive embodiments of the present invention are described below.

In one embodiment, a method for driving a display panel and peripheral devices associated with the display panel through common data lines is provided. The method initiates with identifying a non-display period for the display panel. Than, a peripheral device interface corresponding to one of the peripheral devices is signaled to transmit control data over a control line associated with the peripheral device. Next, data associated with the one of the peripheral devices is selected for transmission through the common data lines during the non-display period. Then, an image quality associated with an image being displayed on the display panel is maintained while the common data lines are being used for communicating with the one of the peripheral devices.

In another embodiment, a graphics controller is provided. The graphics controller includes a memory region configured to store image data for display on a display panel in communication with the graphics controller. Interface circuitry modules where each of the interface circuitry modules is configured to transmit data from the graphics controller over a set of shared data lines are provided. Selection circuitry configured to select data from one of the interface circuitry modules for transmission over the set of shared data lines is included. Line sharing circuitry configured to inform each of the interface circuitry modules to transmit control data is included. The line sharing circuitry is further configured to generate select signals for the selection circuitry. The select signals enable the selection circuitry to select the data from one of the interface circuitry modules for transmission over the shared data lines.

In yet another embodiment, a device is provided. The device includes a central processing unit (CPU), a display panel and a peripheral component. A graphics controller in communication with the CPU is included. The graphics controller is configured to drive the display panel and the peripheral component over a shared set of data lines. The graphics controller includes circuitry configured to select either the display data or the peripheral component data for transmission over the shared set of data lines based upon a display mode signal associated with the display panel.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Figure 1:
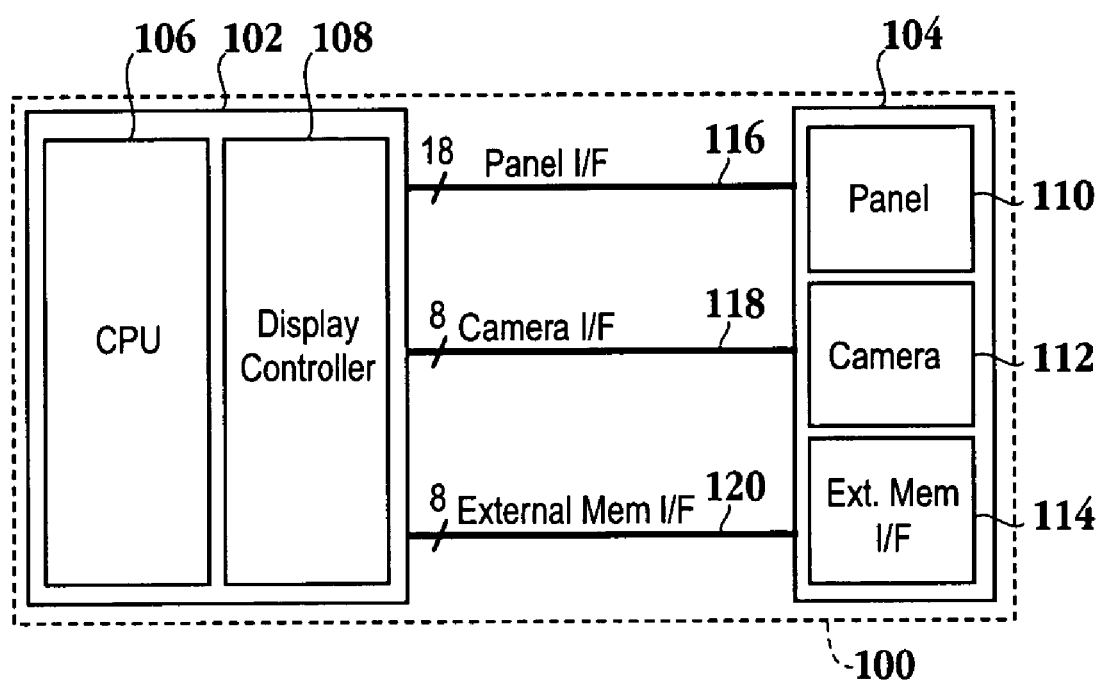
FIG. 1 is a simplified schematic diagram illustrating the configuration of the data lines for a multi-functional hand held device.

An invention is disclosed for providing a shared set of data lines for a display panel and non-display devices. In general, the embodiments described herein exploit a non-display period associated with the display panel to communicate with other devices over a shared set of data lines during the non-display period. It will be apparent, however, to one skilled in the art in light of the following disclosure, that the present invention may be practiced without some or all of these specific details. In other instances, well known process operations have not been described in detail in order not to unnecessarily obscure the present invention. FIG. 1 is described in the "Background of the Invention" section.

The embodiments discussed below provide general purpose data lines capable of being shared between a display device, e.g., a display panel, one or more non-display devices, e.g., a camera, a memory or any other suitable non-display device. In one embodiment, it is determined when a display panel is in an active mode and a non-active mode. During the non-active mode, the shared data lines are used to transmit data to and from the non-display devices. Thus, a graphics controller may communicate with multiple devices through a shared set of data lines. For example, a cellular phone having a digital camera may incorporate the embodiments described herein. Here, a display controller, i.e., graphics controller, of the cellular phone may drive a display panel of the cellular phone during the display period and drive the camera during non-display periods of the display panel.

Figure 2:
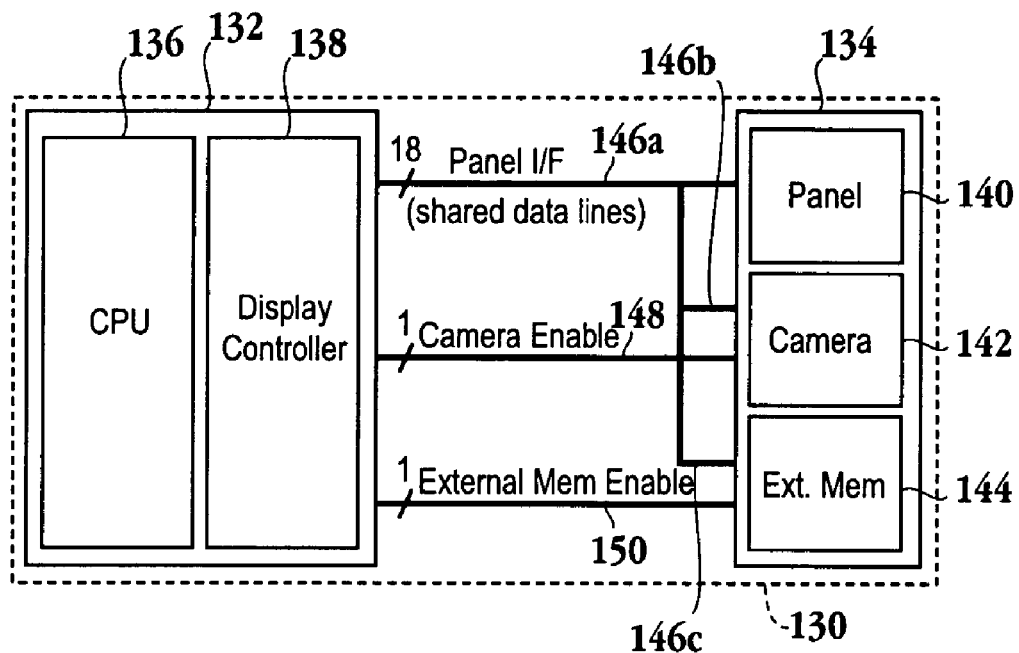
FIG. 2 is a simplified schematic diagram of a device having a set of shared common data lines for supporting multiple peripheral devices in accordance with one embodiment of the invention.

FIG. 2 is a simplified schematic diagram of a device having a set of shared common data lines for supporting multiple peripheral devices in accordance with one embodiment of the invention. Device 130 includes two component sections, 132 and 134. Component section 132 includes central processing unit (CPU) 136 and display controller 138. In one embodiment, display controller 138 is a liquid crystal display controller, (LCDC). It should be appreciated that device 130 may be any suitable hand-held electronic device, e.g., cell phone, personal digital assistant (PDA), etc., and may include a battery to provide the necessary power to operate the device. Where device 130 is a cellular phone, component section 132 may be considered a base, while component section 134 may be considered the "flip" part of the flip phone. Communication lines 146a, 146b, 146c, 148, and 150 transmit data from component section 132 to component section 134 and vice versa. Lines 146a, 146b, and 146c represent shared data lines used to provide data to peripheral components of component section 134. As used herein, the term peripheral components refers to any suitable component that provides additional functionality to the device, e.g., a digital camera component, added to a cellular phone, etc. As illustrated in FIG. 2, peripheral components may include display panel 140, camera 142, and external memory interface 144. As can be seen, the number of data lines has been significantly reduced through the use of the common shared data lines 146a through 146c.

Figure 3:
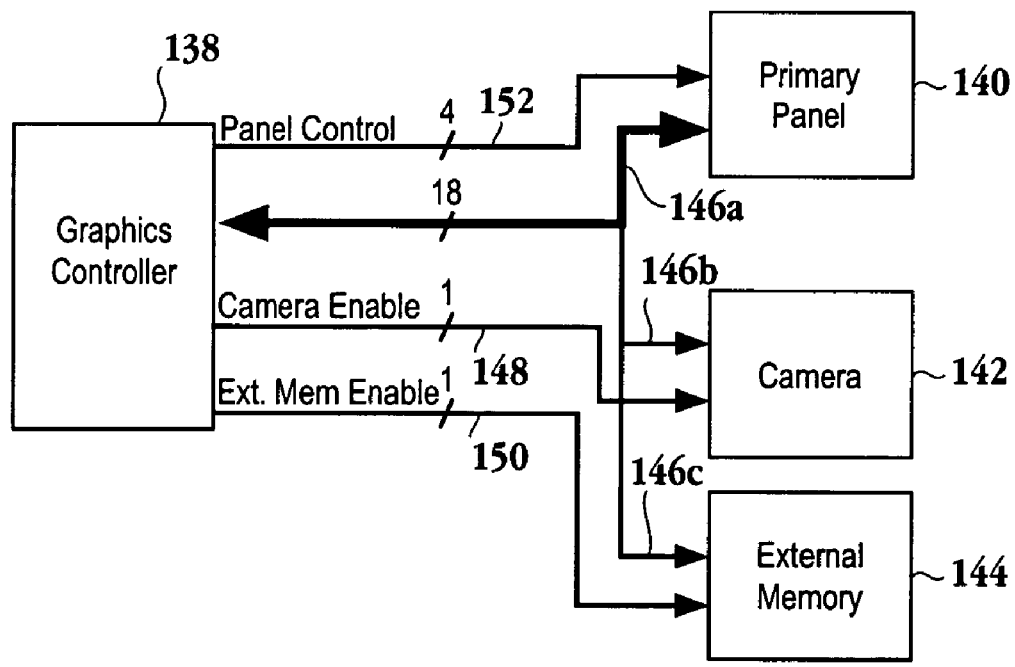
FIG. 3 is a simplified schematic diagram representing an alternative embodiment to FIG. 2.

FIG. 3 is a simplified schematic diagram representing an alternative embodiment to FIG. 2. Here, graphics controller 138 is in communication with primary panel 140, camera 142, and external memory 144 through common data lines 146a, 146b and 146c. As shown, common data lines 146a through 146c are bi-directional. Therefore, data may be transferred to and from device interfaces over the common data lines. Graphics controller 138 also transmits panel control signals through panel control line 152 and enable signals through camera enable line 148 and external memory line 150. It will be apparent to one skilled in the art that the panel control signals include synchronization signal, clock signals, etc. It should be appreciated that the embodiment shown in FIG. 3 may be contained in a single integrated unit, e.g., on a single printed circuit board, rather than the sectional component configuration of FIG. 2. Additionally, primary panel 140 may be a color display or a monochrome display. While FIGS. 2 and 3 provide panel 140, camera 142, and external memory 144 as the peripheral components, these components are provided for exemplary purposes and are not meant to be limiting. Any suitable peripheral component may be employed with the embodiments described herein, e.g., audio modules, ring tone devices, keypad modules, volume control modules, power modules, focus control, GPS interface, temperature sensors, LEDs, etc., may also be included.

Figure 4:
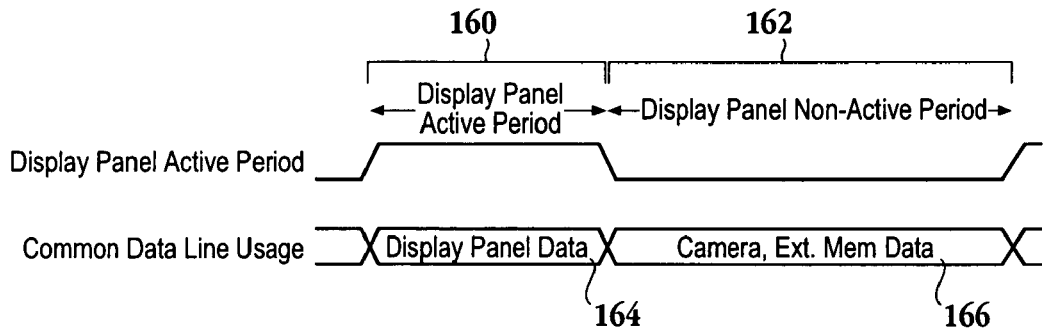
FIG. 4 is a simplified timing diagram illustrating the timing of data across the common data lines in accordance with one embodiment of the invention.

FIG. 4 is a simplified timing diagram illustrating the timing of data across the common data lines in accordance with one embodiment of the invention. Here, display panel active period signal goes high as illustrated in region 160, thereby indicating that the common data line will be used to provide display panel data. When the display panel active period goes low, as illustrated in region 162, the display panel is not active, i.e., a non-display period. Here, data for peripheral devices may be transmitted over the common data lines. For example, data associated with the camera or external memory with reference to FIGS. 2 and 3 may be transmitted through the common data lines. As will be explained with reference to FIG. 4, selection signals and control signals will control which peripheral data is being transmitted over the common data lines. In one embodiment, the display panel contains internal random access memory (RAM), therefore, during a non-display period the image displayed on a parallel panel does not fade, shut off, or distort. Accordingly, as the image on the display panel is left intact during non-display image periods, the data lines going to the panel are available for other purposes. As can be seen, the non-display period for a display panel may be relatively long. Additionally, the common data lines may be made bi-directional in order for data to transfer to and from the variety of peripheral devices. Of course, the signal for the display panel active period may go high during a non-display period and low during the display period as the value of the signal is not important, just that the signal changes between the display and non-display periods.

Figure 5:
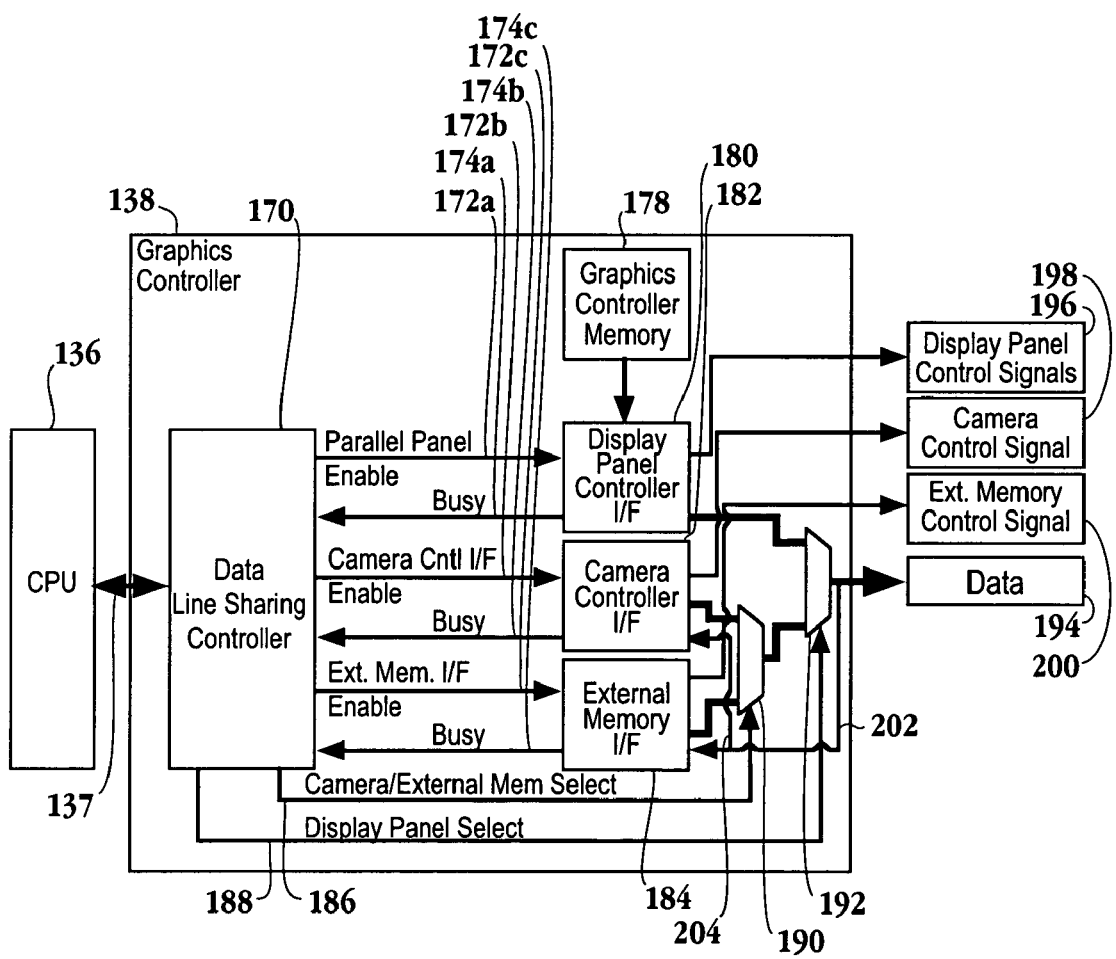
FIG. 5 is a simplified schematic diagram illustrating modules of a graphics controller in accordance with one embodiment of the invention.

FIG. 5 is a simplified schematic diagram illustrating modules of a graphics controller in accordance with one embodiment of the invention. Graphics controller 138 is in communication with CPU 136 over bus 137. Graphics controller 138 includes graphics controller memory 178, display panel controller interface (I/F) 180, camera controller interface 182, and external memory interface 184. Data line sharing controller 170 is in communication with each of display panel controller interface 180, camera controller interface 182, and external memory interface 184. Data line sharing controller is configured to transmit enable signals to each of the interface modules 180 through 184 over enable lines 172a–172c, respectively. Additionally, each of the interface modules 180 through 184 are configured to communicate a busy signal through lines 174a through 174c. The busy signal from the corresponding individual interface controller provides operating feedback to line sharing controller 170 indicating the individual interface controller's access on the Common Data Lines.

Still referring to FIG. 5, data line sharing controller 170 is also capable of transmitting camera/external memory select signals through line 186 and display panel select signal over line 188. It should be appreciated that line sharing controller 170 informs each of the interface modules, 180 through 184, when the time is appropriate to place data over the respective control lines. Thus, display panel control signals 196, camera control signal 198 and external memory control signal 200 originate from the respective interface controller modules as triggered by line sharing controller 170. In one embodiment, during a display panel active period, display panel select signal is high, thereby causing the selection of the output from display panel controller interface module 180 through multiplexer 192. As a result, data from display panel controller interface 180 is transmitted over common data lines 194. However, during a non-display period, display panel select signal will be low, thereby causing the selection of data from one of the peripheral device controller interfaces. For example, if camera external memory select signal 186 is configured to select data from camera controller interface 182, through multiplexer 190, then data output from multiplexer 190 is associated with the camera controller interface. This output is then transmitted to multiplexer 192 and will be selected for transmission over common data lines 194 when display select signal 188 is configured to select the output of multiplexer 190.

Alternatively, if the camera external memory select signal was configured to select data from external memory interface module 184, then the data output onto common data lines 194 would be the data from external memory interface module 184. As the common data lines 194 are bi-directional, the camera controller interface module 182 and the external memory interface module184 may read data from the respective camera or external memory as indicated by lines 202 and 204. In one embodiment, as a further line reduction, if the peripheral devices do not require simultaneous access to the shared lines, the control signals 196, 198, and 200 may be multiplexed onto 2 lines. It should be appreciated that external Device Select will be required to decode a device selected by the 2 signals, e.g., 00 Select Device 0, 01 Select Device 1, 10-Select Device 2, 11-Select Device 3 and so on. The Common Data lines allow up to 18 data lines, however, most external devices may use only up to 8 data lines. Thus, it becomes possible to access more than 1 external device simultaneously, by allocating unused data lines for each external device.

Figure 6:
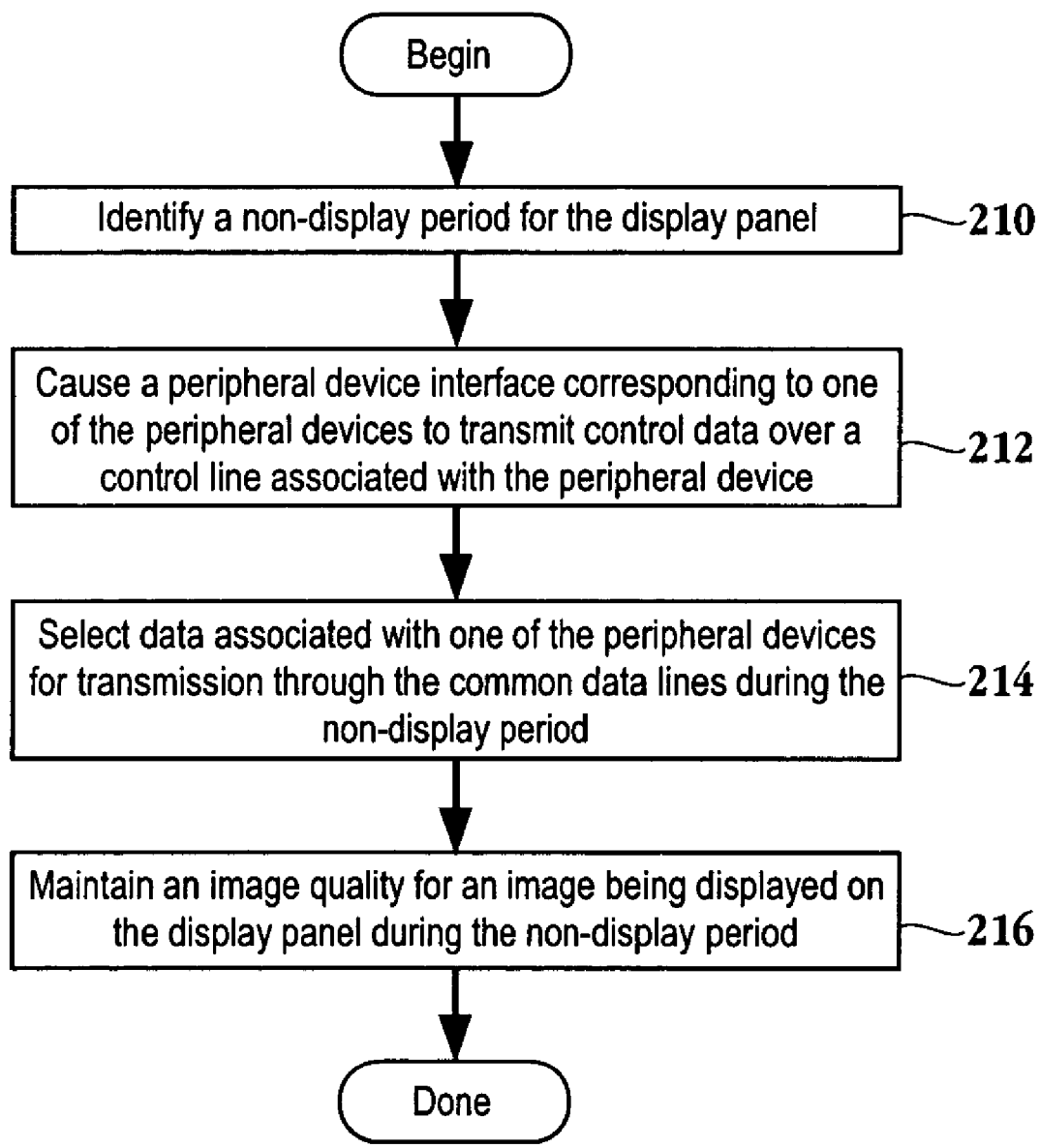
FIG. 6 is a flow chart diagram illustrating the method operations for driving a display panel and peripheral devices associated with the display panel through common data lines in accordance with one embodiment of the invention.

FIG. 6 is a flow chart diagram illustrating the method operations for driving a display panel and peripheral devices associated with the display panel through common data lines in accordance with one embodiment of the invention. The method initiates with operation 210 where a non-display period for the display panel is identified. Here, a display panel active period signal may be monitored and used to identify the non-display period as discussed with reference to FIG. 4. The method then advances to operation 212 where a peripheral device interface corresponding to one of the peripheral devices transmits control data over a control line associated with the peripheral device. Here, a data line sharing controller may transmit an enable signal to the corresponding peripheral device interface to trigger the transmission of the control data as discussed with reference to FIG. 5.

The method of FIG. 6, then proceeds to operation 214 where data associated with one of the peripheral devices is selected for transmission through the common data lines during the non-display period. Again, with reference to FIG. 5, the display panel select signals and the camera/external memory select signals are configured such that that data from either the camera controller interface or the external memory interface is transmitted through the multiplexers to the common data line. Of course, other peripheral devices besides, or in addition to, a camera and an external memory may be included, as FIGS. 2, 3, and 5 are exemplary. The method then moves to operation 216 where the image quality for an image being displayed on the display panel is maintained during the non-display period. In one embodiment, access to a display panel RAM guarantees that the image quality is maintained.

In summary, the above embodiments provide for the use of shared data lines for multi-functional devices. That is, each of the components requires one signal line for device enable purposes with the common data lines being used for all other purposes. In turn, simplified routing on a printed circuit board or through a flex cable is achieved to make the device more robust and reliable. Additionally, power consumption is reduced due to the reduction of display controller Input/Output (I/O) pins.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A graphics controller, comprising:
   a memory region configured to store image data for display on a display panel in communication with the graphics controller;

interface circuitry module, each configured to transmit data from the graphics controller over a set of shared data lines;
selection circuitry, including a first multiplexer and a second multiplexer, configured to select data from one of the interface circuitry modules for transmission over the set of shared data lines; and
line sharing circuitry configured to inform each of the interface circuitry modules to transmit control data, the line sharing circuitry further configured to generate select signals for the selection circuitry, the select signals enabling the selection circuitry to select the data from one of the interface circuitry modules; and
wherein the first multiplexer is configured to select data from one of a plurality of peripheral device modules, and the second multiplexer is configured to select data from one of a display panel interface module and the selected data from the one of the plurality of peripheral device modules.

2. The graphics controller of claim 1, wherein the interface circuitry modules are selected from the group consisting of a display panel controller interface, a camera controller interface, and an external memory interface.

3. The graphics controller of claim 1, wherein the line sharing circuitry is further configured to assert a display panel select signal during an active display period.

4. The graphics controller of claim 1, wherein the line sharing circuitry is further configured to assert a peripheral device select signal during a non-display period.

5. The graphics controller of claim 1, wherein the interface circuitry modules include a peripheral device interface circuitry module, the peripheral device interface circuitry module configured to read data from a peripheral device wherein the data from the peripheral device is transmitted over the set of shared data lines.

6. A device, comprising:
central processing unit (CPU);
a display panel;
a peripheral component; and
a graphics controller as recited in claim 1 in communication with the CPU, the graphics controller configured to drive the display panel and the peripheral component over a shared set of data lines, the graphics controller including circuitry configured to select one of display data and peripheral component data for transmission over the shared set of data lines based upon a display mode signal associated with the display panel.

7. The device of claim 6, wherein a number of shared data lines is equal to eighteen.

8. The device of claim 6, wherein the shared set of data lines are bi-directional.

9. The device of claim 6, wherein the peripheral component is one of a digital camera and an external memory.

10. The device of claim 6, wherein the device is a cellular phone having a first section including the CPU and the graphics controller and a second section including the display panel and the peripheral component, wherein the shared set of data lines enable communication between first section components and second section components.

11. The device of claim 6, wherein the display panel includes random access memory (RAM).

* * * * *